United States Patent [19]
Sachot

[11] Patent Number: 4,470,572
[45] Date of Patent: Sep. 11, 1984

[54] BALANCING DEVICE FOR A MOBILE CARRIAGE OF MACHINES

[75] Inventor: Michel E. Sachot, Saclay, France

[73] Assignee: Centre d'Etudes du Fraisage, Bagneux, France

[21] Appl. No.: 361,060

[22] Filed: Mar. 23, 1982

[30] Foreign Application Priority Data

Apr. 17, 1981 [FR] France .................................. 81 07794

[51] Int. Cl.³ ............................................. F16M 1/00
[52] U.S. Cl. .................................... 248/648; 248/364
[58] Field of Search .............. 248/648, 571, 572, 608, 248/325, 123.1, 292.1, 364, 280.1; 16/1 C; 296/57 A

[56] References Cited

U.S. PATENT DOCUMENTS

| | | | |
|---|---|---|---|
| 4,019,442 | 4/1977 | Lee et al. ................................ | 16/1 C |
| 4,043,529 | 8/1977 | Pickles .................................. | 248/608 |
| 4,277,044 | 7/1981 | Hamilton .......................... | 248/123.1 |

FOREIGN PATENT DOCUMENTS 2033796 5/1980 United Kingdom ................ 248/648

Primary Examiner—William H. Schultz
Assistant Examiner—Ramon O. Ramirez
Attorney, Agent, or Firm—Darby & Darby

[57] ABSTRACT

A balancing device of a unit formed by a first machine carriage (1) supporting a second mobile carriage (4) on the first, in any direction other than the vertical, by means of a counterweight (6) connected to the first carriage (1) via chains (7, 8). This transmission comprises at least two chains (7 and 8) connected to said first carriage (1) via return-pulleys (13, 14) entrained by said chains (7 and 8) and acting on a torsion shaft (15), the relative length of the chain sections (7a, 8a) connecting the pulleys (13, 14) to said first carriage (1) being variable as a function of the displacement of the second carriage (4).

10 Claims, 6 Drawing Figures

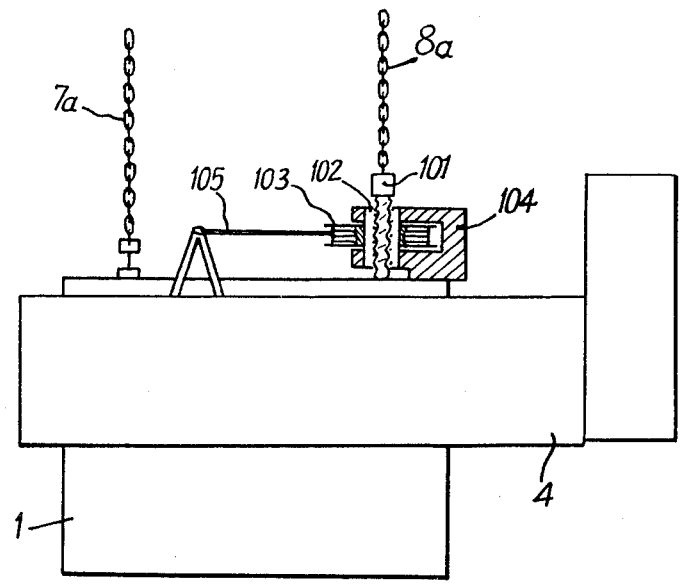
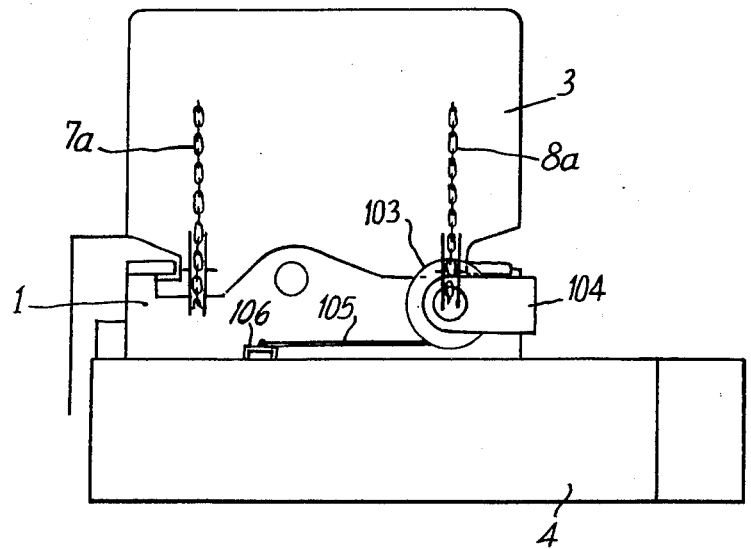

BALANCING DEVICE FOR A MOBILE CARRIAGE OF MACHINES

FIELD AND BACKGROUND OF THE INVENTION

In many machines, particularly machine-tools, there are one or several sliding members, adapted for moving by being guided by slides, on a support which can in turn slide, as is the case for example of a carriage sliding horizontally on a bracket which is in turn sliding vertically.

It is known how to reduce or cancel the action of gravity on the positioning device of such a member by a counterweight, a jack, a spring, etc.

The actions of the forces applied by said means on the unit to be balanced admit a resultant the point of application of which is generally fixed.

In the case of machines comprising a carriage supporting a further carriage, mobile on the first along any direction other than the vertical, the centre of gravity of the unit is displaced; the result is a variable distance between the point of application of the resultant of the balancing forces and the centre of gravity of the carriage unit which creates a couple of forces the moment of which causes the deformation of the guides, the uncontrolled displacement of the carriages within the play provided for their displacement in their slides, as well as antagonistic efforts in the positioning device.

To remedy such a problem the importance of which is increased due to the development of digital controlled machines, various solutions have already been proposed. In fact, on such machines, the positioning of the members is automatic, and it is therefore necessary to avoid or automatically correct the deformations, uncontrolled displacements or plays, which, previously, could be corrected by a manual adjustment.

According to one of such solutions disclosed in French Pat. No. 72.32413 (publication number 2.153.990), a counterweight is used, such that the position of its centre of gravity can be modified by shortening or increasing one of its suspension chains, which support said counterweight in distinct and distant points.

However, the modifications thus obtained are of small amplitude and can be used with good results only if the member which is mobile along a horizontal direction is of small weight, so that the displacement of the centre of gravity is of little importance.

OBJECTS AND SUMMARY OF THE INVENTION

The object of the present invention is a balancing device for a unit formed by a first machine carriage supporting a second carriage mobile on the first along a direction other than the vertical, by means of a counterweight connected to the first carriage by chains, wherein said transmission comprises at least two chains connected to said first carriage via return-pulleys driven by said chains and acting on a torsion shaft, the relative length of the chain sections connecting the pulleys to said first carriage being variable as a function of the displacement of the second carriage.

Due to this arrangement, to the effort applied by the counterweight on each of the connections connecting the chains to the first carriage is added a moment of torsion which varies the relative intensity of such efforts according to the function adopted and, by way of consequence, of a nature capable of compensating for the couple resulting from the displacement of the centre of gravity of the second carriage.

The invention applies also to the hereafter arrangements:

(a) The relative length variation of the chain sections is a linear function of the displacement of the second carriage.

(b) The relative length variation of the chain sections connecting the pulleys to the first carriage is obtained by at least one mobile member the movement of which is controlled by the displacements of the second carriage, said movement varying the distance between the first carriage and the end of the corresponding chain.

(c) Said member is a ramp rigidly connected to the second carriage and on which rolls a roller carried at the end of a chain, the effort applied by said chain being transmitted to the first carriage via the second carriage.

(d) Said member is a mobile mechanical part carried by the first carriage, the displacements of which are controlled by the member controlling the displacements of the second carriage and on which is attached the end of one chain.

(e) The relative length variation of the chain sections is obtained by at least one nut, carried by the first carriage, set in movement by the displacements of the second carriage or by the member controlling said displacements and acting upon a screw carried by the end of a chain.

(f) The counterweight is carried by the chains via a swing bar articulated to a single point of the counterweight.

The object of such an arrangement is that the chain length variations do not cause lateral displacements of the counterweight.

(g) The apparatus carrying the pulleys and the torsion shaft is not provided with a rigid mechanical connection with the carriages and their supporting frame.

(h) The apparatus carrying the pulleys and the torsion shaft rests on bearing parts such as columns transmitting the efforts to the stand or foundation on which the machine frame is fixed, without mechanical connection whith the carriages and the frame.

(i) The relative length variation of the chain sections is established such that the resultant of the balancing forces remains permanently contained in a vertical plane containing the centre of gravity of the carriages unit and perpendicular to the guiding plane of the second carriage.

BRIEF DESCRIPTION OF THE DRAWINGS

The invention will become more apparent from the following description, with reference to the accompanying drawings wherein:

FIG. 5 is a partial side schematic view of an alternative embodiment of FIG. 2;

FIG. 6 is a partial schematic view from above of the same alternative embodiment.

DETAILED DESCRIPTION OF THE EMBODIMENTS

Figure 1:
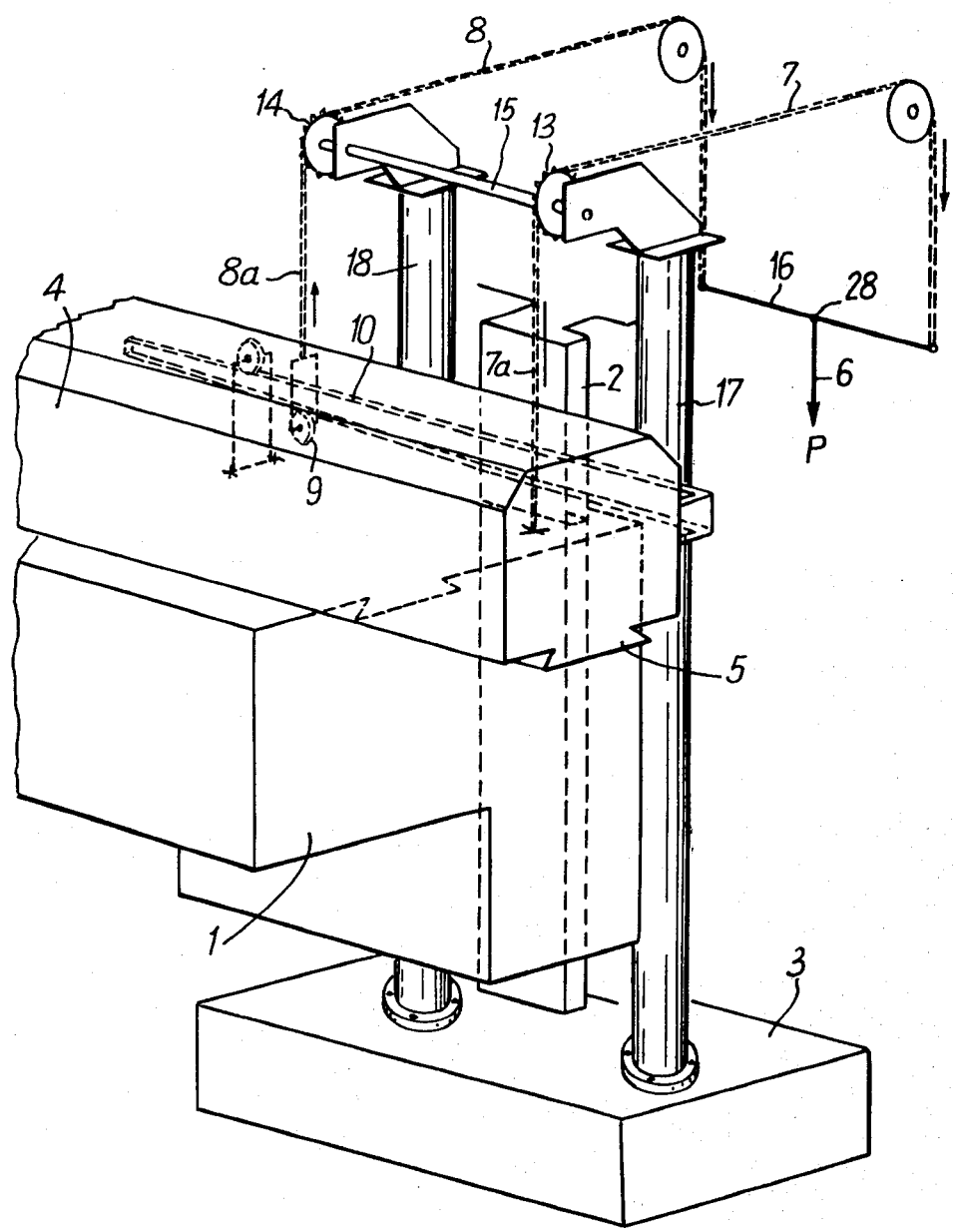
FIG. 1 is a perspective schematic view showing the principle of the invention.

The examples shown relate to the case of a machine-tool comprising a bracket 1 (first carriage) vertically sliding on slides 2 of a frame 3 and supporting a ram or similar 4 (second carriage) horizontally sliding on bracket 1 via slide 5.

The invention is not limited to such an example, nor to the case of the horizontal sliding of the second carriage.

According to the invention, bracket 1 is connected to a counterweight 6 (weight P) via two chains or chain assemblies 7 and 8.

In the example shown, one of said chains, in fact chain 7, is directly connected to bracket 1 via a connection 24, preferably adjustable in height, chain 8 ending with a roller 9 rolling on a ramp 10 connected to ram 4. The transmission of the effort exerted by chain 8 on bracket 1 is carried out either directly or via the roller or rollers 11 rolling on the upper portion of ramp 10 and connected at 12 to bracket 1.

The transmission of the effort exerted by the counterweight 6 on bracket 1 by chains 7 and 8 is carried out by pulleys 13 and 14 which are driven by the chains 7 and 8 (pulleys 22, 23 being simply return-pulleys). For example, chains 7 and 8 are roller-chains and pulleys 13 and 14 have the shape of toothed pinions—any other arrangement within the knowledge of those skilled in the art being adaptable in order to provide the drive of pulleys 13 and 14 by chains 7 and 8.

The pulleys 13 and 14 are rigidly connected to torsion shaft 15.

The ramp 10 is designed so that the displacements of ram 4 cause a length variation of the chain section 8a separating pulley 14 from bracket 1 relative to the length of chain section 7a separating pulley 13 from bracket 1.

This relative variation causes a torsion of shaft 15 which results in a moment M applying on the outer diameter of pulleys 13 and 14 a tangential effort T. Thus if P represents the weight of counterweight 6, the effort applied on bracket 1 by the chain sections 7 and 8 will have the respective values:

$(P/2)+T$ and $(P/2)-T$

The displacement of ram 4 causes a displacement of the centre of gravity of the unit formed by bracket 1 and ram 4, resulting in a couple exerted on slide 2, and the ramp 10 is preferably conformed such that the tension differential on the chains provides a couple of equal value and reverse direction; in other words, ramp 10 will be designed so that the resultant of the efforts exerted by the chain sections 7a and 8a remains constantly in the vertical plane containing the centre of gravity of the ram/bracket unit and perpendicular to the guiding plane of ram 4.

According to an arrangement of the invention, counterweight 6 is hung to the chains 7 and 8 via the swing bar 16 connected to the counterweight 6 via articulation 28; the result is that the relative length variations of the chains have no effect on the lateral position of the centre of gravity of counterweight 6.

In the example shown, the supporting parts 17, 18 are columns which extend through the machine frame 3 without mechanical connection, through simple guiding sockets 25, 26 and transmit the efforts to the machine stand 19 or to the foundation.

As a variant of the ramp 10, one can use other variation means of the relative length of the chain sections 7 and 8 separating pulleys 13 and 14 from bracket 1.

For example, the end of chain 8 can be connected to bracket 1 via a rack of a rotating arm or a cam the rotation of which is controlled by the ram 4 displacements control member.

Or again, said end can carry a screw co-acting with a nut driven in rotation by said control member of the displacements of ram 4, or directly via the latter, during its displacements.

This last embodiment is shown schematically in FIGS. 5 and 6.

Chain section 8a carries at its end a screw 101 engaging into a nut 102 (for example a ball-nut) rigidly connected to a pulley 103. The nut and pulley are trapped inside a shell or fork 104 connected to the bracket. A cable or ribbon 105 is wound on one side on pulley 103 and attached to the other side to support 106 connected to ram 4.

When ram 4 moves, it entrains cable 105 which rotates pulley 103, therefore nut 102, thereby causing the axial movement of screw 101, and a length variation of chain 8. The screw/ball-nut unit being perfectly reversible, the traction applied to chain 8 results in a couple applied to pulley 103, thereby providing a permanent tension on ribbon or cable 105.

Figure 2:
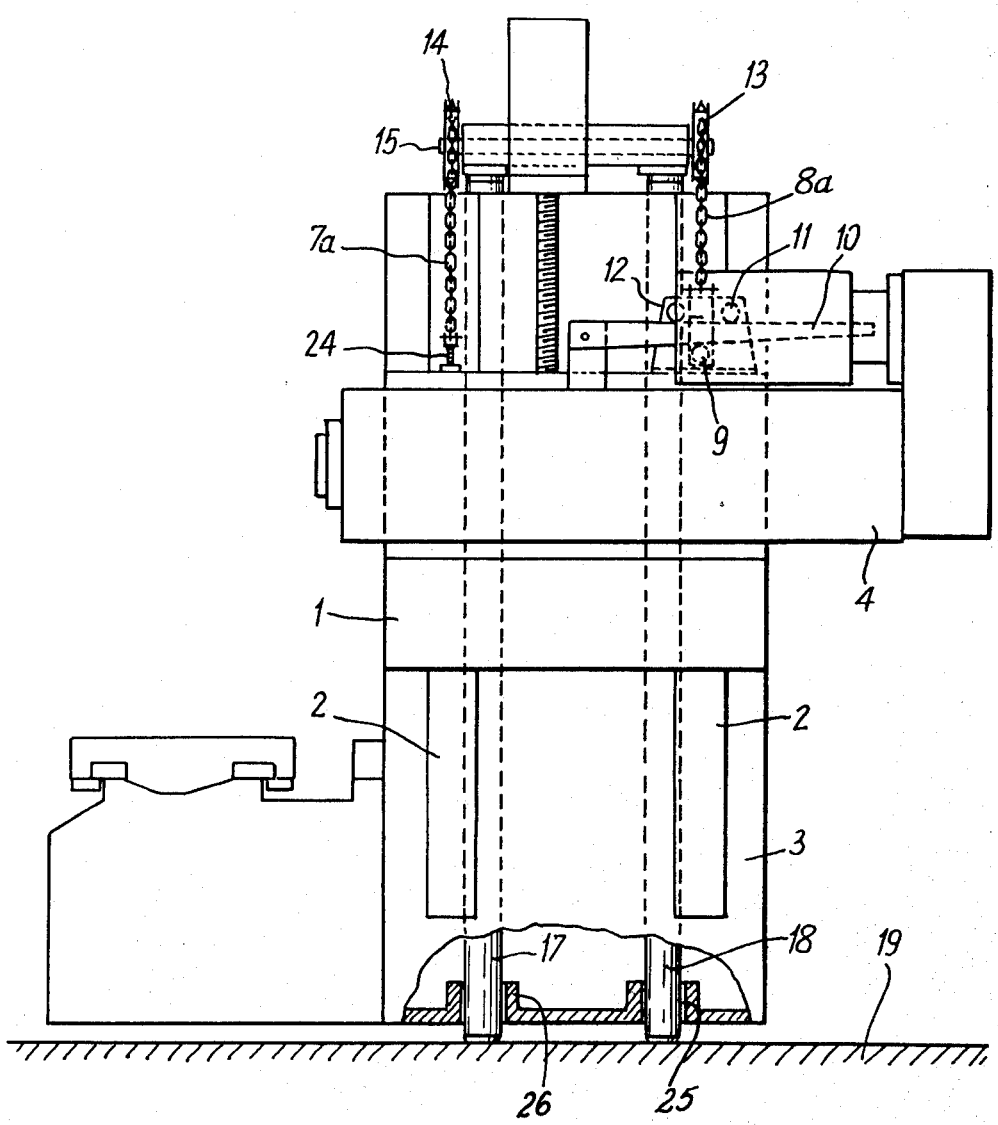
FIG. 2 is a side view of an embodiment.
Figure 3:
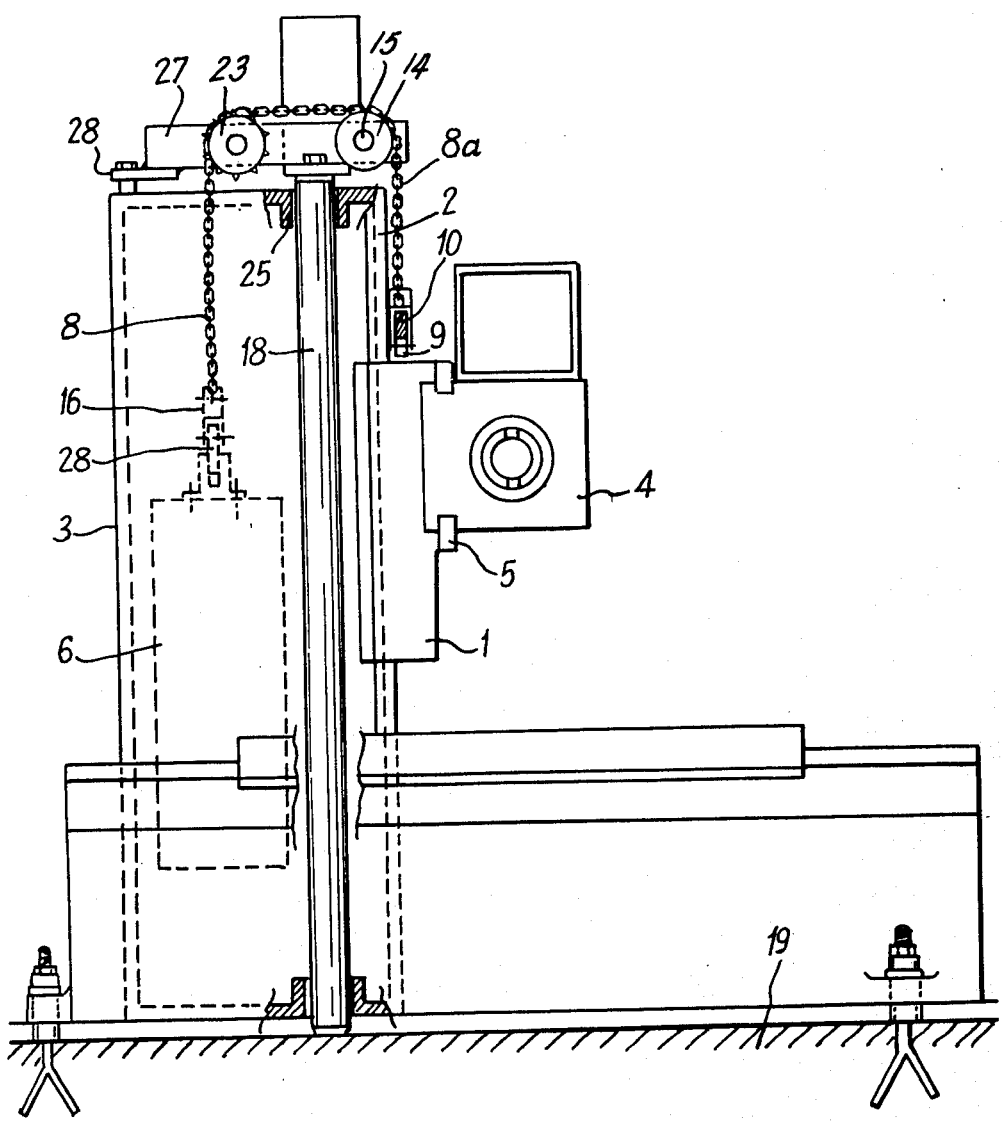
FIG. 3 is a front view of the machine of FIG. 2.
Figure 4:
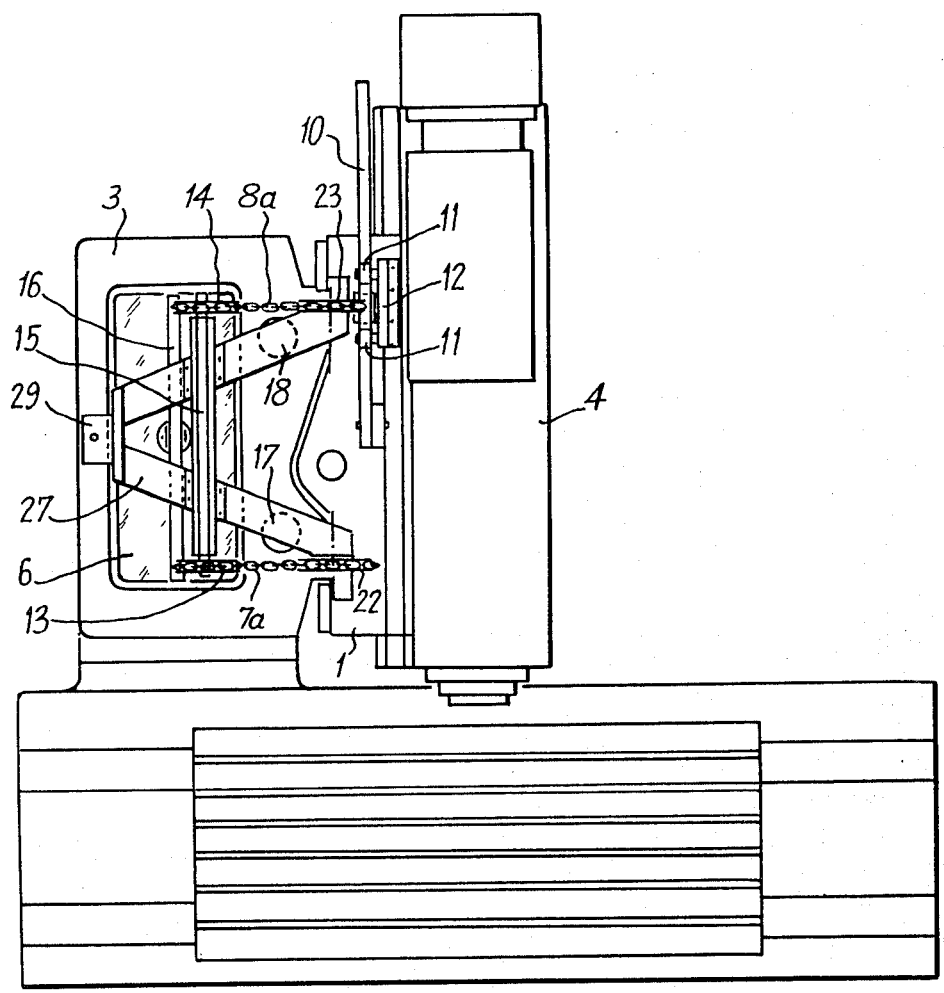
FIG. 4 is a view from above of the machine of FIG. 2.

In the example of FIGS. 2, 3 and 4, the columns 17 and 18 support a chassis 27 carrying the bearings of pulleys 13 and 14, the torsion shaft 15 and the return-pulleys 22, 23. Said chassis 27 is connected to frame 3 via a connection point 29 which is not a rigid fixation and is only completing the fixation provided by sockets 25 and 26.

The invention is not limited to the example described and can be performed in different ways according to the characteristics of the machine to which it is applied.

I claim:

1. A balancing device for a unit formed of a first machine carriage (1) supporting a second mobile carriage (4) on the first in a direction other than the vertical, by means of a counterweight (6) having coupling means for coupling said counterweight to said first carriage said coupling means comprising at least two chains (7 and 8) connected to said first carriage (1) via pulleys (13, 14) driven by said chains (7 and 8) and acting on a torsion shaft (15) the relative length of the chain sections (7a, 8a) connecting pulleys (13, 14) to said first carriage (1) being variable as a function of the displacement of the second carriage (4).

2. A device according to claim 1, wherein the relative length variation of the chain sections (7a, 8a) is a linear function of the displacement of the second carriage.

3. A device according to claims 1 or 2, wherein the relative length variation of the chain sections (7a, 8a) connecting the pulleys to the first carriage (1) is obtained by at least one mobile member (10) the movement of which is controlled by the displacements of said second carriage (4), said movement varying the distance between the first carriage (1) and the end of the corresponding chain (8).

4. A device according to claim 3, wherein said member is a ramp (10) rigidly connected to the second carriage (4) and on which rolls a roller (9) connected to the end of a chain (8), the effort applied by said chain being transmitted to the first carriage via the second carriage.

5. A device according to claims 1 or 2, wherein the relative length variation of said chain sections (7a, 8a) coupling the pulleys to the first carriage (1) is obtained by one mobile mechanical part carried by the first carriage (1) the displacements of which are controlled by the member controlling the displacements of the second carriage (4) and on which is fixed the end of a chain.

6. A device according to claim 5, wherein the relative length variation of the chain sections (7 and 8) is obtained by at least one nut carried by the first carriage, set in movement by the displacements of the second carriage or by the control member of said displacements and acting on a screw carried by the end of a chain.

7. A device according to any one of the preceding claims, wherein the counterweight (6) is carried by the chains (7 and 8) via a swing bar (16) articulated to a single point of counterweight (6).

8. A device according to any one of the preceding claims, wherein said pulleys (13, 14) and said torsion shaft (5) are supported by a chassis (27) devoid of rigid mechanical connection with carriages (1 and 4) and their support frame (3).

9. A device according to any one of the preceding claims, wherein the apparatus (27) carrying the pulleys (13, 14) and the torsion shaft (15) bears on supporting parts (17, 18) such as columns transmitting the efforts to the stand or foundation on which is fixed the machine frame (3) without mechanical connection with the carriages and the frame.

10. A device according to any one of the preceding claims, wherein the relative length variation of the chain sections (7, 8) is established such that the resultant of the balancing forces remains permanently contained in the vertical plane containing the centre of gravity of the carriages unit and perpendicular to the guiding plane of the second carriage (4).

* * * * *